(12) United States Patent
Kerchner

(10) Patent No.: US 7,051,523 B2
(45) Date of Patent: May 30, 2006

(54) EXHAUST SYSTEM ASSEMBLIES EMPLOYING WIRE BUSHINGS FOR THERMAL COMPENSATION

(75) Inventor: Douglas M. Kerchner, Goodrich, MI (US)

(73) Assignee: General Motors Corporation, Detroit, MI (US)

( * ) Notice: Subject to any disclaimer, the term of this patent is extended or adjusted under 35 U.S.C. 154(b) by 106 days.

(21) Appl. No.: 10/797,864

(22) Filed: Mar. 10, 2004

(65) Prior Publication Data

US 2005/0198946 A1    Sep. 15, 2005

(51) Int. Cl.
F01N 7/10 (2006.01)
(52) U.S. Cl. .............................. 60/322; 60/272; 60/312; 60/323; 285/187; 285/291.2; 285/294.1; 285/294.2; 181/212; 181/215; 181/222; 181/227; 181/241; 181/253; 181/254
(58) Field of Classification Search .................. 60/272, 60/312, 313, 314, 322, 323; 285/187, 290.1, 285/290.3, 290.5, 291.2, 294.1, 294.2; 181/247, 181/251, 252, 253, 256, 264, 267, 268, 269, 181/270, 290, 295, 212, 213, 215, 222, 227, 181/228, 231, 241, 254
See application file for complete search history.

(56) References Cited

U.S. PATENT DOCUMENTS

| | | | | | |
|---|---|---|---|---|---|
| 3,581,842 | A | * | 6/1971 | Hall | 181/243 |
| 4,137,993 | A | * | 2/1979 | Rutt | 181/282 |
| 5,350,888 | A | * | 9/1994 | Sager et al. | 181/247 |
| 5,365,025 | A | * | 11/1994 | Kraai et al. | 181/249 |
| 6,189,650 | B1 | * | 2/2001 | Inuzuka et al. | 181/254 |
| 6,571,910 | B1 | * | 6/2003 | Storm | 181/264 |
| 6,840,348 | B1 | * | 1/2005 | Takewaka et al. | 181/252 |

* cited by examiner

Primary Examiner—Binh Q. Tran
(74) Attorney, Agent, or Firm—Laura C. Hargitt

(57) ABSTRACT

Exhaust system assemblies employ wire bushings for thermal compensation to minimize noise due to "stick-slip" while the system cools. In a preferred embodiment, the wire bushings are formed of at least one strand of wire coiled about male end portions of pipe sections used in the system, each of which male end portions are inserted into a female end portion and held therein by an interference fit. The strand of wire is spot welded at spaced locations to the male end portions to provide bearing surfaces between the spot welds that move slightly as the exhaust system heats and cools to relieve thermal stress in small, substantially inaudible increments.

10 Claims, 5 Drawing Sheets

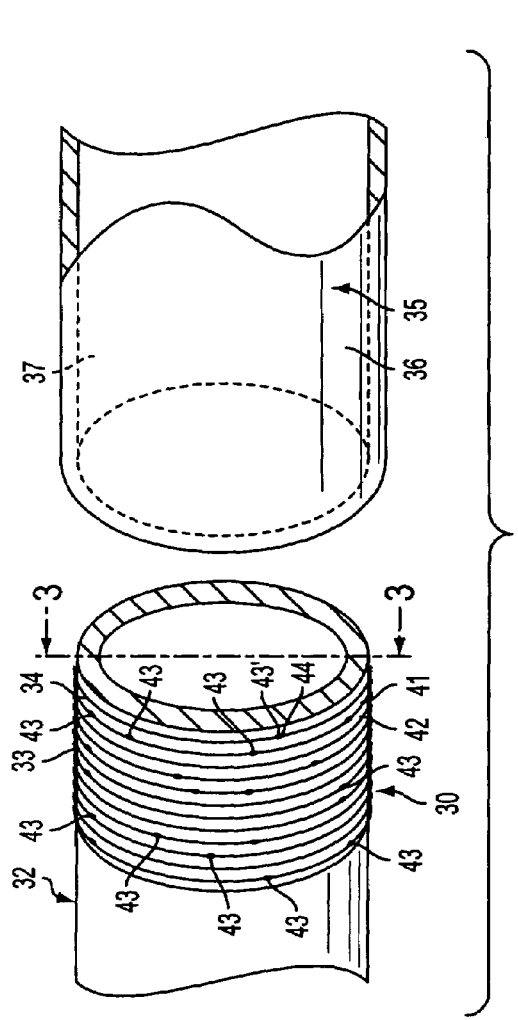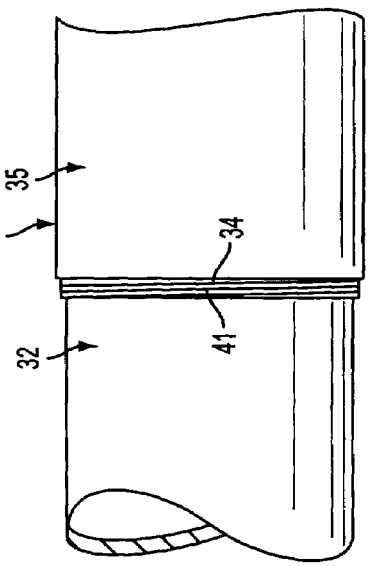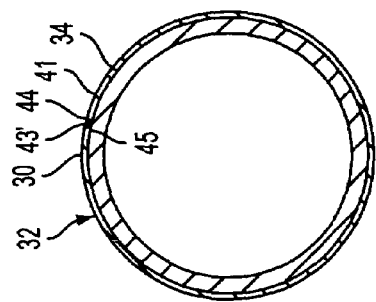
FIG. 2
FIG. 4
FIG. 3

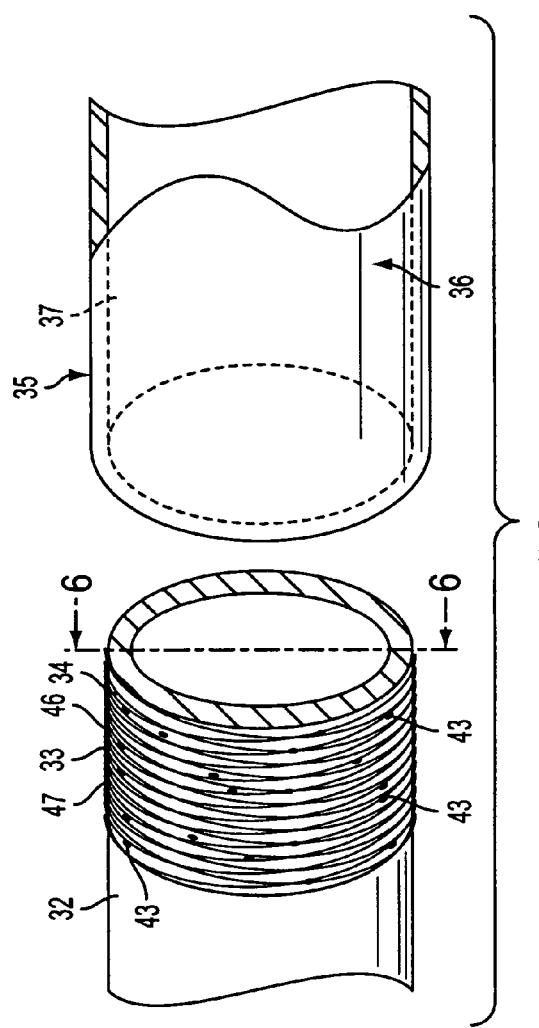
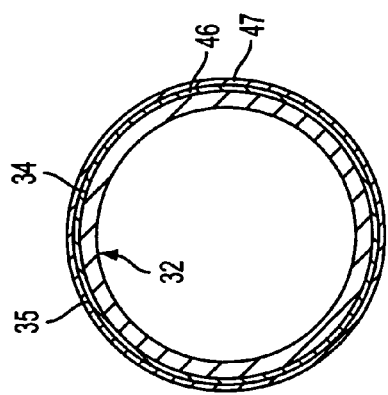
FIG. 5
FIG. 6

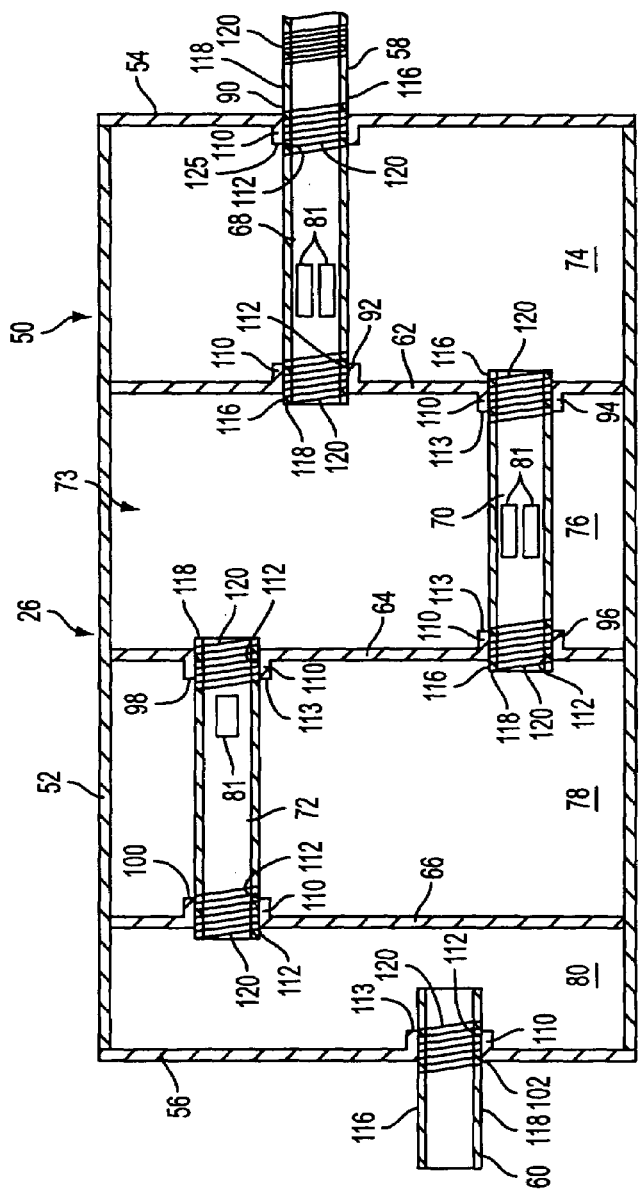
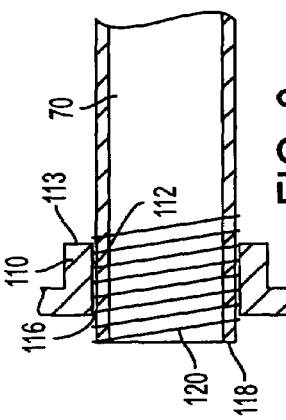

EXHAUST SYSTEM ASSEMBLIES EMPLOYING WIRE BUSHINGS FOR THERMAL COMPENSATION

FIELD OF THE INVENTION

The present invention is directed to exhaust system assemblies employing wire bushings for thermal compensation. More particularly, the present invention is directed to such exhaust system assemblies for use with internal combustion engines, wherein the assemblies include joints between components that have different thermal rates of expansion.

BACKGROUND OF THE INVENTION

The components of exhaust systems used with internal combustion engines are exposed to temperatures which range from atmospheric temperatures to operating temperatures of about 800° C. that occasionally climb to about 1,000° C. Exhaust system components that contact one another often produce a noisy "stick-slip" condition as the system heats up and cools down. The stick-slip condition is caused by relative motion between parts due to differences in thermal expansion and contraction rates of parts in contact. In an exhaust system there can be relative movement between baffle plates and internal pipes within mufflers, as well as between various external pipes which connect mufflers to the exhaust of an internal combustion engine, such as air-gap down pipes. In addition, there can be relative movement between intermediate pipes disposed between primary and secondary mufflers and between tail pipes connected to the outlets of muffler systems. The noise generated by stick-slip can be irritating and disconcerting, thus detracting from the driving experience.

A current solution to this problem is to insert wire mesh ring bushings between components, but this is relatively expensive due to the cost of the bushings. Another approach is to weld components to one another, but this tends to generate high stresses in the components. Accordingly, there is a need to address this problem with an inexpensive solution compatible with currently employed configurations of mufflers and other components of exhaust system assemblies.

SUMMARY OF THE INVENTION

In view of the aforementioned considerations, the present invention is directed to an exhaust system assembly having piping components for conveying exhaust gases from an internal combustion engine through the assembly, wherein the piping arrangements comprise at least a first pipe having a male end with an external wall surface and at least a second pipe having a female end with an internal wall surface. A wire bushing is disposed between the external wall surface of the male end of the first pipe and the internal wall surface of the female end of the second pipe, the wire bushing being constructed and arranged to compensate for thermal expansion between the male and female ends of the first and second pipes, respectively.

In a further aspect of the invention, a muffler included in the exhaust system assembly has a housing enclosing a space with a sound attenuating system therein; wherein there are first and second end cap plates on the housing and baffle plates within the housing, each having holes therethrough defined by axially extending surfaces, and wherein there are inlet pipes, outlet pipes and internal pipes having axially extending exterior surfaces and male ends passing through the holes in the plates. When the pipes are assembled with their plates, the exterior surfaces of the pipes are adjacent to the axially extending interior surfaces of the holes. Wire bushings are positioned between the interior surface of at least one of the holes and the exterior surfaces of at least one of the pipes to compensate for unequal rates of expansion and contraction between the pipes and plates.

In still a further aspect of the invention, the exhaust assembly includes a down pipe comprising a core pipe and an outer jacket surrounding and spaced from the core pipe by an air space. The air jacket is connected to the core pipe adjacent to ends of the core pipe and ends of the air jacket by wire bushings that compensate for different rates of thermal expansion between the core pipe and air jacket.

In a preferred embodiment of the invention, each of the wire bushings employed comprise at least one strand of metallic wire wrapped around a male end portion of a pipe to provide an interference fit between the exterior surface of the pipe and the interior surface of either a hole or another pipe having a female end with an interiorly facing surface. Although other attachment techniques may be employed, the strand of wire in a preferred embodiment is spot welded to the male end portion of the pipe.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 2 is a side perspective view showing a pair of pipes separated and employing a wire bushing configured in accordance with the principles of the present invention;

FIG. 3 is an end view of one of the pipes of FIG. 2 taken along line 3—3 of FIG. 2.

FIG. 4 is a side view of the pair of pipes of FIG. 2 assembled;

FIG. 5 is a side perspective view similar to FIG. 2 but showing a second embodiment of a wire bushing configured in accordance with the present invention;

FIG. 6 is an end view of one of the pipes of FIG. 5 taken along line 6—6 of FIG. 5;

FIG. 7 is a side elevation of a muffler exemplifying mufflers used in an exhaust system assembly such as that of FIG. 1;

FIG. 8 is an enlarged view of a portion of FIG. 7;

DETAILED DESCRIPTION

Figure 1:
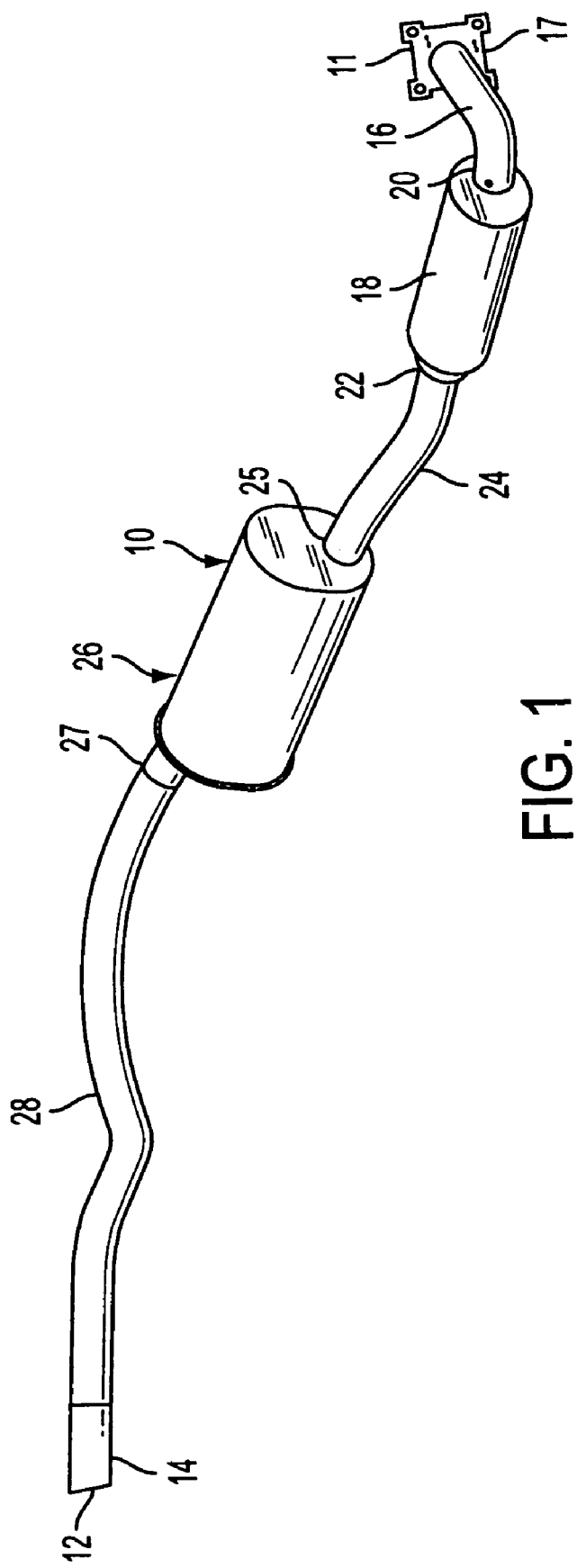
FIG. 1 is a perspective view of an exhaust system utilizing the principles of the present invention therein.

Referring now to FIG. 1 there is shown an exhaust system 10 that has components typical of exhaust systems utilizing at least one bushing configured in accordance with the principles of the present invention. The exhaust system 10 has a first end 11 which is joined to the exhaust of an internal combustion engine and a second end 12 comprised of a tail pipe 14. The first end 11 includes a down pipe 16, preferably configured as the air gap down pipe of FIG. 4, which has a flange 17 for connection to the exhaust manifold of an internal combustion engine and is connected to an inlet pipe of a catalytic converter 18 by a joint 20. The catalytic converter 18 has an outlet pipe which is joined by a joint 22 to an intermediate pipe 24 that in turn is connected by a joint 26 to the inlet pipe of a muffler 26. The muffler 26 has an outlet pipe which is joined by a joint 27 to a pipe extension 28 that has the tail pipe 14 at its terminous. The joints 20, 22 and 27, as well pipe joints within the catalytic converter and muffler 18 and 26, may employ wire bushings such as the bushing 30 shown in FIGS. 2–4 and the bushing 31 shown in FIGS. 5 and 6.

In FIG. 2 a pipe 32 having a male end portion 33 with an external wall surface 34 and a pipe 35 having a female end portion 36 with an internal wall surface 37 are shown prior to assembly. The pipe 32 may be of a constant diameter or may be stepped to have a reduced diameter at the male end portion 33. The pipe 35 may be of a continuous internal diameter larger than that of the pipe 32 or may have a reduced diameter spaced inboard of the at the female end portion 36.

In a preferred embodiment, the metal wire bushing 30 forms a joint 40 comprised of a metal wire strand 41 which is wound as a helix to form a single layer 42 over the external wall surface 34 of the male end portion 33 of the pipe 32. In accordance with one technique of the attachment, the metal wire strand 41 is spot welded by welds 43 at various spaced locations to form a welded joint arrangement on the exterior surface 34 of the male portion 33. By spot welding the strand at spaced locations 43, the strand 41 is divided into separate bearing portions between the welds that move slightly as the exhaust system 10 heats up and cools down to relieve thermal stress in small, substantially inaudible increments. While spot welding is preferred, other techniques for holding the metal wire strand 41 may be employed, such as but not limited to, wrapping the wire strand tightly against the external wall surface 34 or otherwise mechanically or metallurgically attaching the wire strand to the male end portion 33 of the pipe 32. Alternatively, the wire strand may be attached to the internal wall surface 37 of the female end portion 36 by welding or by other attachment arrangements.

In order to seal the space between the male and female end portions 33 and 36, the free end 44 (see FIG. 3) of the metal wire strand 41 is preferably spot welded by weld 43' to both the external wall surface 34 of the male end portion 32 and an adjacent turn 45 of the helix formed by the metal wire strand as the strand is wound of the external wall surface 34. The weld at the free end 44 of the metal wire strand 41 prevents exhaust gas from following the path defined by the helix of the wire layer through the bushing 30.

A joint such as the joint 40 of FIG. 4 is then formed by inserting the male end portion 33 into the female end portion 36 in an interference fit between the layer 42 of the helically wound, metal wire strand 41 and the internal wall surface 37 of the female end portion. The interference fit (or friction fit) provides a sufficient seal due to the long path of engagement between the wound wire strand 41 and the internal wall surface 37 of the female end portion 36. Since the metal wire strand 41 is spot welded at spaced locations 43 along its length, the bushing 30 formed by the strand provides a bearing surface which allows slippage between the external wall surface 34 and the internal surface 37 of the male and female end portions 33 and 36, respectively. This slippage is in small increments and eliminates, or substantially minimizes, audible sound emitted from the joints 40 of the pipes 32 and 35 due to thermal expansion while the associated engine is heating up or cooling down, and/or during operation of the engine.

The first and second pipes 32 and 36 for original equipment manufacturers are made almost exclusively of stainless steels of a 400 series, such as 409 and 439 stainless steels, with 300 series stainless steels also being used. After market exhaust systems may use aluminized co-rolled steel and/or non-aluminized co-rolled steel, as well as various stainless steels for exhaust piping such as piping utilizing the pipes 32 and 35. The strand of wire 41 is preferably also stainless steel of the 400 series (409, 439) or other stainless steels such as 300 series stainless steels. Other steels or metals may also be used for the metal wire strand. The diameter of the metal wire strand 41 is in the range of about 0.30 mm to about 0.40 mm with a preferred range of about 0.34 mm to about 0.36 mm, however any diameter that is suitable for reducing stick-slip sounds may be used.

While a single strand of metal wire 41 in a single layer 42 is preferred, two or more, overlapping helical layers 46 and 47 of metal wire 41 as is seen in FIGS. 5 and 6, may be employed. The overlapped layers 46 and 41 are also spot welded to the external wall surface 34 of the male end portion 33 of pipe 32. In accordance with one embodiment, the layers 46 and 47 are also spot welded to one another. The layers 46 and 47 are preferably made of a single strand of metal wire 41 wound initially in a single layer 46 over the external surface 34 and then wound back over itself to form the second layer 47, however the layers 46 and 47 may be of separate strands of the same metal or different metals. While two layers 46 and 47 are shown in the embodiment of FIGS. 5 and 6, other embodiments of the invention include more than two layers.

In still further embodiments of the invention, the bushings 30 and 31 may be made of strands comprised of natural or unnatural materials, such as heat resistant polymers, carbon fibers or natural minerals.

Referring now to FIGS. 7 and 8, there is shown in generally schematic form, a representative muffler, such as the muffler 26 of FIG. 1. The muffler 26 includes a housing 50 formed of a hollow annular shell 52 closed by first and second end cap plates 54 and 56, respectively. An inlet pipe 58 projects from the interior of the housing 50 through the first end cap plate 54 and an outlet pipe 60 projects through the second end cap plate 56. As is seen in FIG. 1, the inlet pipe 58 connects to the intermediate pipe 24, while the outlet pipe 60 connects to the outlet pipe extension 28 which in turn connects to the tail pipe 14. Within the shell 52 of the housing 50 are three baffle plates 62, 64 and 66 which are connected by internal pipes 68, 70 and 72. The baffle plates 62, 64 and 66 divide an acoustical chamber 73 defined by the shell 52 and the end plates 54 and 56 into first, second, third, fourth compartments 74, 76, 78 and 80. In order to permit flow between the chambers, the internal pipes 68, 70 and 72 each have lateral openings such as slots 81 therein which allow exhaust gas to vent laterally into the chambers 74 and 76 and to enter the pipe 72 so as to be carried through to the outlet pipe 60. Alternatively, the baffle plates 62, 64 and 66 have openings therethrough so that chambers 74 and 78 are not isolated from exhaust gas flow.

The end cap plate 54 has a hole 90 therethrough which aligns with a hole 92 in baffle plate 52 so that exhaust gas flows into the acoustical chamber 76 and out of the end of pipe 68 with portions of the exhaust gas passing through slots 81 in the pipe 68 into the compartment 74. The compartment 74 is connected to the compartment 78 by the pipe 70 through a hole 94 in baffle plate 62 and a hole 96 in baffle plate 64 so that exhaust gas flows into compartment 78 with portions exiting from the pipe 70 through slots 81 into the compartment 76. The compartment 76 is connected by the pipe 72 to the compartment 80 through holes 98 and 100 in the baffle plates 64 and 66, respectively. Exhaust gases which accumulate in compartment 78 then enter the pipe 72 through openings 81 and the pipe 72 for transmission to the compartment 80. From the compartment 80 the exhaust gases leave the housing 50 of the muffler 26 through the outlet 60 seated within the hole 102 through end plate 56. It is emphasized that FIG. 7 is a representative configuration for a muffler such as the muffler 26 in which there are numerous arrangements for passing exhaust gas therethrough to dampen the sound of exhausts from internal combustion engines.

As seen in FIG. 8 in conjunction with FIG. 7, each of the holes 90–102 as defined by an annular flange 110 having an interior, axially extending surface 112 and an exposed annular edge 113. The inlet pipe 58 with its internal portion 68 and the internal pipes 70 and 72, as well as the external pipe 60 each have an exterior surface 116 at a male end portion 118 around which is wrapped a wire bushing 120, configured in accordance with the principles of the present invention, and similar to the wire bushing 30 of FIGS. 2–5 and/or the wire bushing 31 of FIGS. 5 and 6. Preferably, the pipes are retained by interference fits solely using engagement of the bushings 120 with the surfaces 112. Optionally, additional structures, such as but not limited to, abutment between shoulders on the pipes and the edges 113 may be employed.

Figure 9:
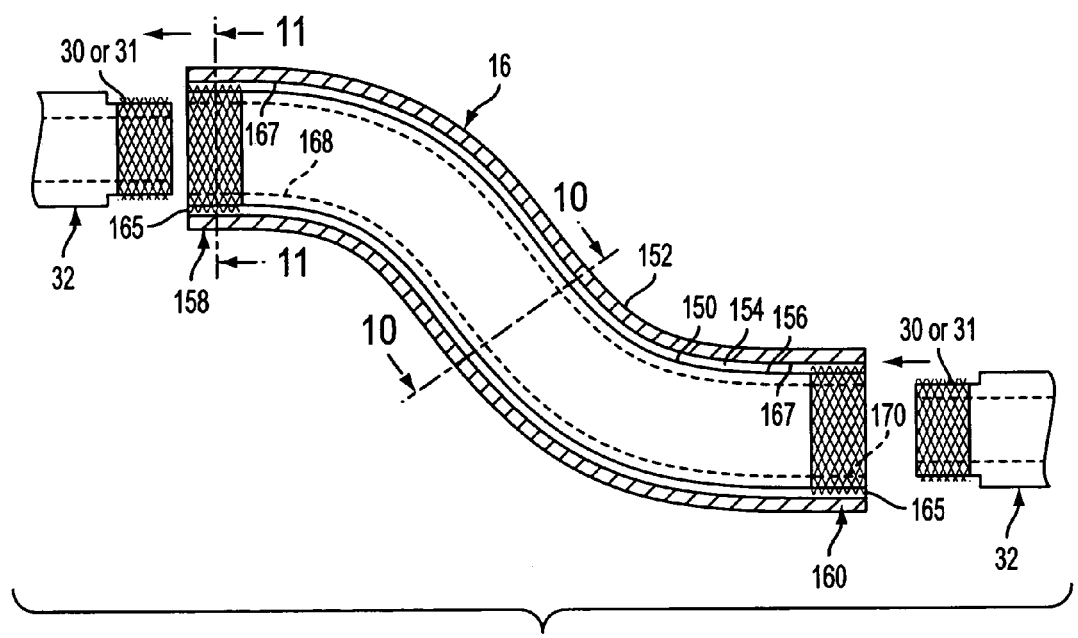
FIG. 9 is a side elevation of an air gap down pipe and adjacent connecting pipes coupled using wire bushings.
Figure 10:
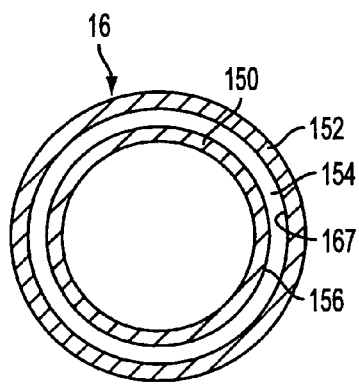
FIG. 10 is an elevation taken along lines 10—10 of FIG. 7.
Figure 11:
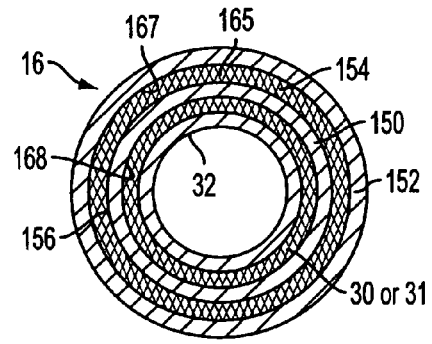
FIG. 11 is an elevation taken along lines 11—11 of FIG. 9 showing one of the connecting pipes assembled with the air gap down pipe.

Referring now to FIGS. 9, 10, and 11, where the air gap down pipe 16 is shown, it is seen that the air gap down pipe has a length of core pipe 150 which is surrounded by an annular metal jacket 152 to define an air space 154 therebetween. The air space 154 provides a thermal break and reduces heat transfer from the air gap down pipe 16 adjacent the engine (not shown) so that engine compartment components (not shown) positioned proximate the exhaust system do not overheat. The core pipe 150 has an external surface 156 and first and second end portions 158 and 160, respectively. Disposed around the first and second end portions 158 and 160 are wire bushings 165 that are similar in configuration to the bushings 30 and 31 of FIGS. 2–4 and FIGS. 5 and 6. The annular metal jacket 152 has an internal surface 167 that has an interference fit with the wire bushings 165. In a preferred embodiment of the invention, the ends 158 and 160 of the core pipe 150 have internal female surfaces 168 and 170 which receive male end portions of pipes such as the pipes 32 of FIGS. 2–6, which have wire bushings such as bushings 30 (FIGS. 2–4) and 31 (FIGS. 5 and 6) therearound. The bushings 30 and 31 of FIGS. 9 and 11 compensate for differences in the rates of expansion between the core pipe 150 and adjoining pipes or pipe fittings 32 when the air-gap down pipe 16 is joined with an exhaust system assembly, such as the exhaust system assembly 10 of FIG. 1. If necessary, the annular metal jacket 152 is necked down at ends 158 and 160 so that the gap 154 is decreased, enabling the wire bushings 165 to provide an interference fit between the annular metal jacket and the core pipe 150.

While it has been disclosed in the illustrated embodiments that the metal wire bushings 30 and/or 31 of the present invention are present at all pipe-to-pipe or pipe-to-plate joints in the exhaust system assembly 10 of FIG. 1, it is to be understood that the wire bushings according to the present invention, need only be used where stick-slip noise is a concern.

From the foregoing description, one skilled in the art can easily ascertain the essential characteristics of this invention, and without departing form the spirit and scope thereof, can make various changes and modifications of the invention to adapt it to various usages and conditions.

The invention claimed is:

1. A muffler for connecting with an exhaust pipe of an internal combustion engine, the muffler including a housing enclosing a space with a sound attenuating system therein, the muffler assembly comprising:
    an array of baffle plates within the housing and first and second end cap plates closing the housing, the plates having first rates of thermal expansion and being spaced from one another to define chambers within the housing;
    pipes extending through holes in the plates, wherein the holes are defined by axially extending surfaces, the pipes interconnecting the chambers and having second rates of thermal expansion different from the first rates, and
    wire bushings between at least one of the pipes and the holes in the plates to compensate for the different rates of thermal expansion between the pipes and plates.

2. The muffler assembly of claim 1 further including an air gap down pipe connected at a first end to the exhaust pipe of the engine and at a second end to the muffler, the air gap down pipe having a core pipe and outer jacket surrounding the core pipe in spaced relation thereto, wire bushings disposed between the core pipe and jacket at the first and second ends of the air gap down pipe to compensate for different rates of thermal expansion between the core pipe and jacket.

3. The muffler assembly of claim 2 wherein the bushings comprise at least one metal wire wrapped around the core pipe and spot welded thereto to provide interrupted bearing surfaces between the core pipe and jacket at the ends of the core pipe and jacket.

4. A muffler for connecting with an exhaust pipe of an internal combustion engine, the muffler having a housing enclosing a space with a sound attenuating system therein, the muffler comprising:
    first and second end cap plates on the housing, the end cap plates each having a hole therethrough defined by an axially extending interior surface;
    inlet and outlet pipes having axially extending exterior surfaces on ends passing through the holes in the end cap plates of the housing with the exterior surfaces of the pipes being adjacent to the axially extending interior surfaces defining the holes;
    baffle plates within the housing, the baffle plates each having at least one hole therethrough defined by an axially extending surface;
    interior pipes with axially extending exterior surfaces passing through the holes through the baffle plates with the exterior surfaces of the pipes being adjacent to the axially extending interior surfaces defining the holes, and
    wire strand bushings between the interior surfaces of the holes and the exterior surfaces of the pipes to compensate for unequal thermal expansion of the plates and pipes.

5. The muffler assembly of claim 4 wherein the strand bushings are metal wire strands which have discontinuous fixed contact with the exterior surfaces of the pipes at least in the axial direction of the pipes and holes.

6. The muffler assembly of claim 5 wherein each of the bushings is comprised of at least one strand of metal wire wrapped about the exterior surfaces of the pipes in at least a first layer.

7. The muffler assembly of claim 6 wherein there is at least one additional layer of metal wire strand wrapped over the first layer of metal wire strand.

8. The muffler assembly of claim 7 wherein the first layer of metal wire strand is a helix slanting in a first axial direction and wherein the additional layer metal wire strand is a helix slanting in an axial direction opposite the first axial direction.

9. The muffler assembly of claim 6 wherein there are more than two layers of metal wire strand each slanting in a different axial direction than layer adjacent thereto.

10. The muffler assembly of claim 4 wherein the strand bushings are made of carbon, polytetrafluoroethyene, natural fibers, or temperature resistant polymers.

* * * * *